GORDON & PECKHAM.
Spectacles.
No. 27,359.                                      Patented March 6, 1860.
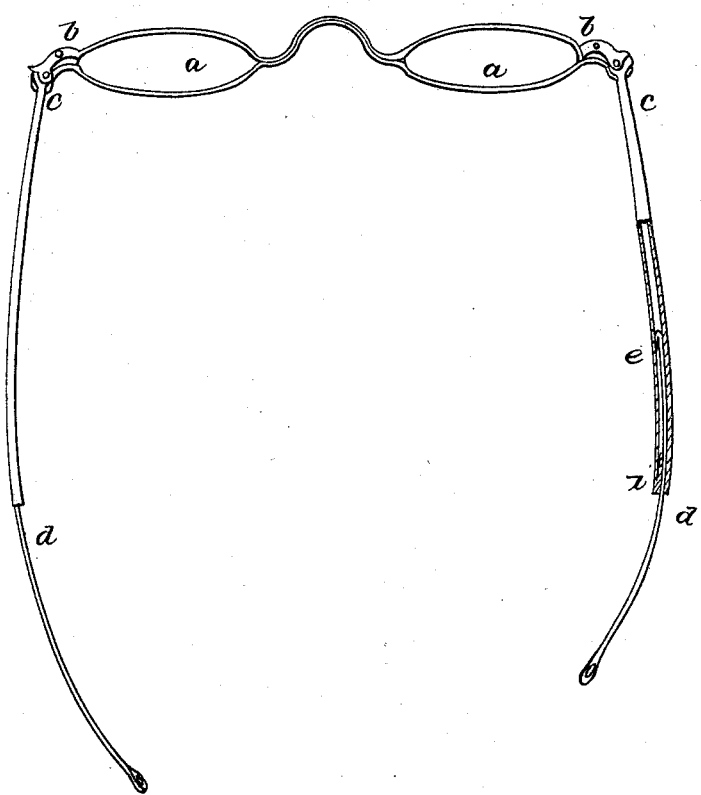 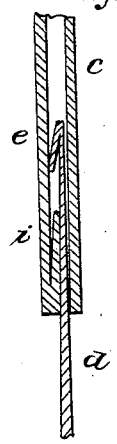

UNITED STATES PATENT OFFICE.

EDWARD W. GORDON, OF NEW YORK, N. Y., AND WILLIAM H. PECKHAM, OF HOBOKEN, NEW JERSEY.

SPECTACLE-TEMPLE.

Specification of Letters Patent No. 27,359, dated March 6, 1860.

*To all whom it may concern:*

Be it known that we, EDWARD W. GORDON, of the city and State of New York, and WILLIAM H. PECKHAM, of Hoboken, in the county of Hudson and State of New Jersey, have invented, made, and applied to use a certain new and useful Improvement in Spectacle-Temples; and we do hereby declare that the following is a full, clear, and exact description of the construction and operation of the same, reference being had to the annexed drawing, making part of this specification, wherein—

Figure 1, is a perspective view of our improved spectacle temples, with one temple partially in section, and Fig. 2, is a section of the temple and slide in larger size to show the parts.

The same marks of reference denote like parts.

Our said invention is an improvement upon the spectacle temple said to have been invented by J. J. Low, and for which Letters Patent were granted April 17th 1849. In the aforesaid patent of Low a hollow temple and slide are provided, and the slide is prevented from drawing entirely out of the temple by a projection; if however the hollow temple becomes bent or receives any injury by dents or otherwise the slide is very liable to become obstructed in its movements; and if no accident happens to such temple, the slide quickly wears loose and is not convenient in use.

The nature of our said invention does not therefore consist in a hollow temple but it does consist in providing a spring stop or stops which act not only to arrest and determine the movement of the slide but also render said slide uniform in its movements either under wear, or in case of any ordinary dents or injuries to which the temples of spectacles are liable even when carefully used.

In the drawing $a$, $a$, are the glasses, $b$, $b$, the frames and joints as usual, receiving the temples $c$, $c$, that are formed hollow and receive the slides $d$, $d$.

$e$, is a spring stop formed by bending around and flattening the end of the slide, or may be formed by a piece of metal attached thereto. This end of the slide passes freely into the hollow temple, and in sliding up and down therein the point or end of the spring stop although touching the inside of the temple to form the necessary friction will freely pass any dents or curvatures from bends that may be produced in the ordinary use of spectacles. In like manner the spring stop $i$, that is attached at the end of the temple within the hollow pipe, springs and allows to pass any bends or imperfections of the slide $d$, and the ends of the spring stops $e$, and $i$, coming together prevent the slide being entirely withdrawn from the temple. These parts may be so constructed that the slide spring $e$, can be forced past the spring $i$, in constructing the spectacles, after the parts are entirely complete ready to be set together in this manner.

Having thus described our said invention we do not claim the hollow temple with a slide and stop, but

What we do claim and desire to secure by Letters Patent is—

Constructing the hollow temples and slides of spectacles with (either or) both of the spring stops $e$, $i$, substantially as and for the purposes specified.

In witness whereof we have hereunto set our signatures this thirtieth day of January 1860.

EDWARD WILLIAM GORDON.
WM. H. PECKHAM.

Witnesses:
THOS. GEO. HAROLD,
CHAS. H. SMITH.